(12) United States Patent
Lee

(10) Patent No.: US 11,629,819 B2
(45) Date of Patent: Apr. 18, 2023

(54) PRESSURE VESSEL AND METHOD OF MANUFACTURING SAME

(71) Applicants: Hyundai Motor Company, Seoul (KR); Kia Motors Corporation, Seoul (KR)

(72) Inventor: Dong Sun Lee, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/173,752

(22) Filed: Feb. 11, 2021

(65) Prior Publication Data

US 2022/0170594 A1 Jun. 2, 2022

(30) Foreign Application Priority Data

Dec. 1, 2020 (KR) ........................ 10-2020-0165541

(51) Int. Cl.
| | |
|---|---|
| *F17C 1/06* | (2006.01) |
| *F17C 1/16* | (2006.01) |
| *B29C 53/60* | (2006.01) |
| *B29K 307/04* | (2006.01) |
| *B29L 31/00* | (2006.01) |

(52) U.S. Cl.
CPC .............. *F17C 1/06* (2013.01); *B29C 53/602* (2013.01); *F17C 1/16* (2013.01); *B29K 2307/04* (2013.01); *B29L 2031/7156* (2013.01); *F17C 2201/0109* (2013.01); *F17C 2203/0604* (2013.01); *F17C 2203/067* (2013.01); *F17C 2203/0624* (2013.01); *F17C 2203/0665* (2013.01); *F17C 2203/0673* (2013.01); *F17C 2209/2154* (2013.01)

(58) Field of Classification Search
CPC ...... F17C 1/06; F17C 1/16; F17C 2201/0109; F17C 2203/067; F17C 2209/2154; B29C 53/602; B29K 2307/04; B29L 2031/7156; B65D 2203/0621; B65D 2203/0619
USPC ........................................................ 220/589
See application file for complete search history.

(56) References Cited

U.S. PATENT DOCUMENTS

| | | | |
|---|---|---|---|
| 3,994,431 A * | 11/1976 | Steiner | B65H 81/00 |
| | | | 228/904 |
| 6,190,481 B1 | 2/2001 | Iida et al. | |
| 2017/0291352 A1 * | 10/2017 | Ueda | B29C 53/665 |
| 2020/0049312 A1 * | 2/2020 | Sawai | F17C 1/06 |

FOREIGN PATENT DOCUMENTS

WO WO-2019206959 A1 * 10/2019 ............. B29C 53/56

* cited by examiner

*Primary Examiner* — John K Fristoe, Jr.
*Assistant Examiner* — Laura E. Parker
(74) *Attorney, Agent, or Firm* — Slater Matsil, LLP

(57) ABSTRACT

A pressure vessel includes a liner including a cylinder part and side parts provided at both ends of the cylinder part, each side part having a dome shape, and a carbon fiber layer including a first hoop layer surrounding a part of an outer circumferential surface of the cylinder part and second hoop layers surrounding other parts of the outer circumferential surface of the cylinder part, each of the second hoop layers having a thickness different from a thickness of the first hoop layer.

18 Claims, 20 Drawing Sheets

PRESSURE VESSEL AND METHOD OF MANUFACTURING SAME

CROSS-REFERENCE TO RELATED APPLICATIONS

This application claims the benefit of Korean Patent Application No. 10-2020-0165541, filed in the Korean Intellectual Property Office on Dec. 1, 2020, which application is hereby incorporated herein by reference.

TECHNICAL FIELD

The present disclosure relates to a pressure vessel and a method of manufacturing the same.

BACKGROUND

A hydrogen vehicle is configured to produce its own electricity by means of a chemical reaction between hydrogen and oxygen and to travel by operating a motor. More specifically, the hydrogen vehicle includes a hydrogen tank ($H_2$ tank) configured to store hydrogen ($H_2$), a fuel cell stack configured to produce electricity by means of an oxidation-reduction reaction between hydrogen and oxygen ($O_2$), various types of devices configured to discharge produced water, a battery configured to store the electricity produced by the fuel cell stack, a controller configured to convert and control the produced electricity, and a motor configured to generate driving power.

A TYPE 4 pressure vessel may be used as the hydrogen tank of the hydrogen vehicle. The TYPE 4 pressure vessel includes a liner (e.g., a nonmetallic material), and a carbon fiber layer formed by winding a carbon fiber composite material around an outer surface of the liner.

Meanwhile, the carbon fiber composite material is lightweight and excellent in strength and elasticity but is expensive (for example, about 20 or more times more expensive than typical carbon steel having the same weight). Therefore, it is necessary to minimize the amount of use of the carbon fiber composite material in order to reduce costs required to manufacture the pressure vessel.

However, if the amount of use of the carbon fiber composite material, which is used to form the carbon fiber layer of the pressure vessel, is decreased (for example, if a thickness of the carbon fiber layer is decreased) to a certain degree, there is a problem in that it is difficult to ensure sufficient structural rigidity of the pressure vessel (particularly, structural rigidity against hoop stress applied in a circumferential direction to a cylinder part of the pressure vessel), and stability and reliability deteriorate.

Therefore, recently, various studies have been conducted to ensure structural rigidity and minimize the amount of use of the carbon fiber composite material, but the study result is still insufficient. Accordingly, there is a need for development of a technology for ensuring structural rigidity and minimizing the amount of use of the carbon fiber composite material.

SUMMARY

The present disclosure relates to a pressure vessel and a method of manufacturing the same. Particular embodiments relate to a pressure vessel with ensured structural rigidity and improved stability and reliability, and a method of manufacturing the pressure vessel.

Embodiments of the present disclosure may ensure structural rigidity of a pressure vessel and minimize the amount of use of a carbon fiber composite material.

Embodiments of the present disclosure may reduce a weight and manufacturing costs. Also, embodiments of the present disclosure may simplify a manufacturing process and improve manufacturing efficiency.

The advantages achieved by the exemplary embodiments are not limited to the above-mentioned objects, but also include advantages or effects that may be recognized from the solutions or the exemplary embodiments described below.

An exemplary embodiment of the present disclosure provides a pressure vessel including a liner including a cylinder part, and side parts provided at both ends of the cylinder part and each having a dome shape, and a carbon fiber layer including a first hoop layer provided to surround a part of an outer circumferential surface of the cylinder part, and second hoop layers provided to surround the other parts of the outer circumferential surface of the cylinder part and each having a thickness different from a thickness of the first hoop layer.

This is to ensure structural rigidity of the pressure vessel and minimize the amount of use of a carbon fiber composite material.

That is, the carbon fiber composite material is lightweight and excellent in strength and elasticity but is expensive. Therefore, it is necessary to minimize the amount of use of the carbon fiber composite material in order to reduce costs required to manufacture the pressure vessel.

However, if the amount of use of the carbon fiber composite material, which is used to form the carbon fiber layer of the pressure vessel, is decreased (for example, if a thickness of the carbon fiber layer is decreased) to a certain degree, there is a problem in that it is difficult to ensure sufficient structural rigidity of the pressure vessel (particularly, structural rigidity against hoop stress applied in a circumferential direction to a cylinder part of the pressure vessel), and stability and reliability deteriorate.

In contrast, according to the exemplary embodiment of the present disclosure, the carbon fiber layer is configured by using the first and second hoop layers having different thicknesses, and as a result, it is possible to obtain an advantageous effect of ensuring structural rigidity of the pressure vessel and reducing the amount of use of the carbon fiber composite material.

Above all, according to the exemplary embodiment of the present disclosure, the carbon fiber layer is configured by using the first and second hoop layers having different thicknesses, and as a result, it is possible to obtain an advantageous effect of ensuring sufficient structural rigidity, which resists hoop stress applied in a circumferential direction to the cylinder part of the pressure vessel, and reducing the amount of use of the carbon fiber composite material.

According to an exemplary embodiment of the present disclosure, the first hoop layer may be provided to have a first thickness, and the second hoop layer may be provided to have a second thickness smaller than the first thickness.

In particular, the second thickness of the second hoop layer may be ½ or less of the first thickness.

According to an exemplary embodiment of the present disclosure, the first hoop layer may be provided to surround a central region of the cylinder part, and the second hoop layers may be provided to surround two edge regions of the cylinder part with the first hoop layer interposed therebetween.

In particular, a center of the first hoop layer may correspond to a center of the cylinder part, a length of the first hoop layer may be 40% to 60% of a length of the cylinder part, and a length of the second hoop layer may be 20% to 30% a length of the cylinder part.

This is derived from the fact that the hoop stress applied to the central region of the cylinder part (the section in which the first hoop layer is formed) is highest and the hoop stress applied to the two edge regions of the cylinder part (the sections in which the second hoop layers are formed) is gradually decreased as the distance from the side parts is decreased.

In an exemplary embodiment of the present disclosure as described above, the thickness of the first hoop layer, which is formed in the section to which the relatively high hoop stress is applied (in the central region of the cylinder part where the hoop stress is concentrated), is large, whereas the thickness of the second hoop layer, which is formed in the section to which the relatively low hoop stress is applied (in the edge region of the cylinder part), is small. As a result, it is possible to ensure sufficient structural rigidity against the hoop stress applied to the cylinder part, and it is possible to reduce the amount of use of the carbon fiber composite material, which is used to form the second hoop layer, to the extent that the thickness of the second hoop layer is reduced. As a result, it is possible to obtain an advantageous effect of reducing a weight of the pressure vessel and reducing manufacturing costs.

The structures of the first and second hoop layers may be variously changed in accordance with required conditions and design specifications.

According to an exemplary embodiment of the present disclosure, the first hoop layer may include an inner hoop layer provided to surround the outer circumferential surface of the cylinder part, and an outer hoop layer provided to surround an outer surface of the inner hoop layer.

According to an exemplary embodiment of the present disclosure, the second hoop layer may include a first winding layer wound around the outer circumferential surface of the cylinder part, and a second winding layer wound around the outer circumferential surface of the cylinder part so as to define the same layer as the first winding layer.

According to an exemplary embodiment of the present disclosure, the first hoop layer may be provided by winding a carbon fiber composite material at a first winding angle, and the second hoop layer may be provided by winding the carbon fiber composite material at a second winding angle different from the first winding angle.

In particular, the second winding angle may be defined as an angle smaller than the first winding angle. For example, the first winding angle may be 89° to 91°, and the second winding angle may be larger than 85° and smaller than 89°.

Since the second winding angle is smaller than the first winding angle as described above, it is possible to ensure a predetermined space (the section where no carbon fiber composite material is wound) between the adjacent first winding layers during the first winding process (primary winding process), and the second winding layer is wound in the space between the adjacent first winding layers during the second winding process (secondary winding process), such that the first winding layer and the second winding layer may be in close contact with each other and disposed alternately in the longitudinal direction of the cylinder part while defining the same layer.

According to another exemplary embodiment of the present disclosure, the first winding layer and the second winding layer may be disposed to be spaced apart from each other in the longitudinal direction of the cylinder part.

According to an exemplary embodiment of the present disclosure, the pressure vessel may include a helical layer that surrounds an outer surface of the first hoop layer, outer surfaces of the second hoop layers, and outer surfaces of the side parts.

Another exemplary embodiment of the present disclosure provides a method of manufacturing a pressure vessel, the method including a preparation step of providing a liner including a cylinder part, and side parts provided at both ends of the cylinder part and each having a dome shape, a first hoop layer forming step of forming a first hoop layer that surrounds a part of an outer circumferential surface of the cylinder part, and a second hoop layer forming step of forming second hoop layers that surround the other parts of the outer circumferential surface of the cylinder part and each have a smaller thickness than the first hoop layer.

According to an exemplary embodiment of the present disclosure, the first hoop layer may be provided to surround a central region of the cylinder part in the first hoop layer forming step, and the second hoop layers may be provided to surround two edge regions of the cylinder part with the first hoop layer interposed therebetween in the second hoop layer forming step.

In particular, a center of the first hoop layer may correspond to a center of the cylinder part, a length of the first hoop layer may be 40% to 60% of a length of the cylinder part, and a length of the second hoop layer may be 20% to 30% of a length of the cylinder part.

According to an exemplary embodiment of the present disclosure, the first hoop layer may be provided by winding a carbon fiber composite material at a first winding angle in the first hoop layer forming step, and the second hoop layer may be provided by winding the carbon fiber composite material at a second winding angle smaller than the first winding angle in the second hoop layer forming step.

According to an exemplary embodiment of the present disclosure, the first hoop layer forming step may include an inner hoop layer forming step of forming an inner hoop layer that surrounds the outer circumferential surface of the cylinder part, and an outer hoop layer forming step of forming an outer hoop layer that surrounds an outer surface of the inner hoop layer, and the second hoop layer forming step may include a first winding layer forming step of winding a first winding layer around the outer circumferential surface of the cylinder part, and a second winding layer forming step of winding a second winding layer around the outer circumferential surface of the cylinder part so as to define the same layer as the first winding layer, in which the inner hoop layer and the first winding layer may be formed first, and then the outer hoop layer and the second winding layer may be formed.

According to an exemplary embodiment of the present disclosure, the method of manufacturing a pressure vessel may include a helical layer forming step of forming a helical layer that surrounds an outer surface of the first hoop layer, outer surfaces of the second hoop layers, and outer surfaces of the side parts.

DETAILED DESCRIPTION OF ILLUSTRATIVE EMBODIMENTS

Figure 1:
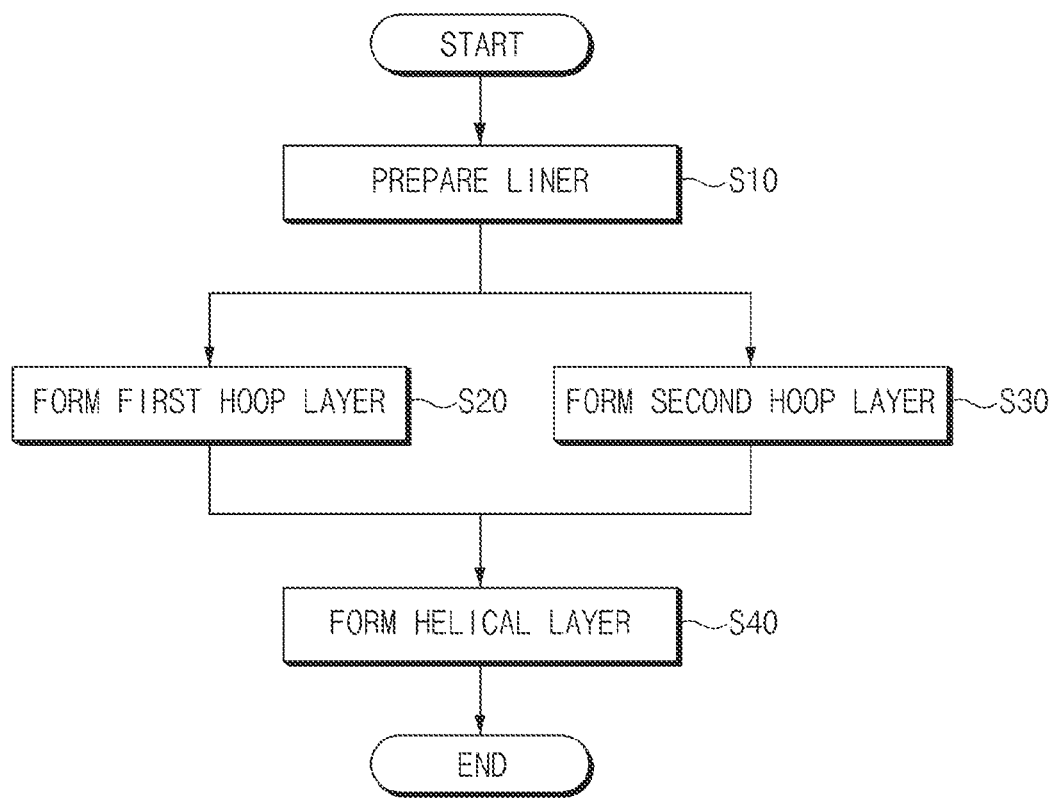
FIG. 1 is a block diagram for explaining a method of manufacturing a pressure vessel according to an exemplary embodiment of the present disclosure.

Hereinafter, exemplary embodiments of the present disclosure will be described in detail with reference to the accompanying drawings.

However, the technical spirit of the present disclosure is not limited to the exemplary embodiments described herein but may be implemented in various different forms. One or more of the constituent elements in the exemplary embodiments may be selectively combined and substituted within the scope of the technical spirit of the present disclosure.

In addition, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiments of the present disclosure are for explaining the exemplary embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 12, a method of manufacturing a pressure vessel according to an exemplary embodiment of the present disclosure includes a preparation step S10 of providing a liner 100 including a cylinder part 110, and side parts 120 provided at both ends of the cylinder part 110 and each having a dome shape, a first hoop layer forming step S20 of forming a first hoop layer 300 that surrounds a part of an outer circumferential surface of the cylinder part 110, and a second hoop layer forming step S30 of forming second hoop layers 400 that surround the other parts of the outer circumferential surface of the cylinder part 110 and each have a smaller thickness than the first hoop layer 300.

For reference, a pressure vessel 10 according to an exemplary embodiment of the present disclosure may be used to store a high-pressure fluid (liquid or gas), and the present disclosure is not restricted or limited by the type and the property of the fluid stored in the pressure vessel 10.

Hereinafter, a configuration in which the pressure vessel 10 according to an exemplary embodiment of the present disclosure is used as a hydrogen tank of a hydrogen storage system applied to a hydrogen vehicle will be described as an example.

Step 1:

First, the liner 100 including the cylinder part 110 and the side parts 120 is provided (S10).

In the preparation step S10, the liner 100 in which the dome-shaped side parts 120 are integrally formed at both ends of the cylinder part 110 is provided.

The liner 100 has a hollow structure having a storage space therein, and high-pressure compressed hydrogen may be stored in the storage space.

The material of the liner 100 may be variously changed in accordance with required conditions and design specifications, and the present disclosure is not limited or restricted by the material of the liner 100. In particular, the liner 100 may be made of a nonmetallic material such as high-density plastic with excellent restoring force and excellent fatigue resistance.

More specifically, the liner 100 includes the cylinder part 110 having a hollow cylindrical shape, and the dome-shaped side parts 120 integrally formed at both ends of the cylinder part 110.

Step 2:

Next, the first hoop layer 300 is formed to surround a part of the outer circumferential surface of the cylinder part 110 (S20).

In the first hoop layer forming step (S20), the first hoop layer 300 may be formed by winding a carbon fiber composite material, which is made by impregnating carbon fibers with epoxy, thermosetting resin, and the like, around an outer surface (outer circumferential surface) of the cylinder part 110 by using a typical winding device.

For reference, in an exemplary embodiment of the present disclosure, the first hoop layer 300 may be defined as a layer for (ensuring structural rigidity) resisting stress (e.g., maximum hoop stress) mainly applied in a circumferential direction among types of stress applied to the cylinder part 110.

For example, the first hoop layer 300 may be formed by winding the carbon fiber composite material around the outer surface of the cylinder part 110 at a winding angle (first winding angle) θ1 of 89° to 91° with respect to an axis of the cylinder part 110.

For example, the carbon fiber composite material may be wound around the outer surface of the cylinder part 110 by a winding jig (not illustrated). The winding angle of the carbon fiber composite material with respect to the cylinder part 110 may be changed by adjusting an angle (posture) at which the winding jig is disposed with respect to the cylinder part 110.

In particular, in the first hoop layer forming step (S20), the first hoop layer 300 may be formed to have a first thickness T1 that may resist maximum hoop stress applied to the cylinder part 110. The first thickness T1 of the first hoop layer 300 may be variously changed in accordance with required conditions and design specifications (e.g., the structure and the size of the pressure vessel).

Step 3:

Next, the second hoop layers 400 are formed to surround the other parts of the outer circumferential surface of the cylinder part 110 (S30).

In the second hoop layer forming step S30, the second hoop layer 400 may be formed by winding a carbon fiber composite material, which is made by impregnating carbon fibers with epoxy, thermosetting resin, and the like, around the outer surface (outer circumferential surface) of the cylinder part 110 by using the typical winding device.

For reference, in an exemplary embodiment of the present disclosure, the second hoop layer 400 may be defined as a layer for (ensuring structural rigidity) resisting stress (hoop stress) mainly applied in the circumferential direction among types of stress applied to the cylinder part 110.

For example, the second hoop layer 400 may be formed by winding the carbon fiber composite material around the outer surface of the cylinder part 110 at a winding angle (second winding angle) θ2 of 85° to 89° with respect to the axis of the cylinder part 110.

In particular, in the second hoop layer forming step S30, the second hoop layer 400 may be formed to have a second thickness T2 smaller than the first thickness T1 of the first hoop layer 300. More particularly, the second thickness T2 of the second hoop layer 400 may be defined to be ½ or less of the first thickness T1 (the thickness of the first hoop layer).

According to an exemplary embodiment of the present disclosure, the first hoop layer 300 is provided to surround a central region of the cylinder part 110 in the first hoop layer forming step (S20), and the second hoop layers 400 are provided to surround two edge regions of the cylinder part 110 with the first hoop layer 300 interposed therebetween in the second hoop layer forming step (S30).

In particular, a center of the first hoop layer 300 corresponds to a center C of the cylinder part, a length of the first hoop layer 300 is 40% to 60% of a length L of the cylinder part 110, and a length of the second hoop layer 400 is 20% to 30% of the length L of the cylinder part 110.

That is, if the length of the first hoop layer 300 is less than 40% of the length L of the cylinder part 110, there is a problem in that bursting strength of the pressure vessel is decreased. If the length of the first hoop layer 300 is more than 70% of the length L of the cylinder part 110, there is a problem in that the amount of use of the carbon fiber composite material is increased, and hydrogen weight efficiency (wt %) of the pressure vessel deteriorates. Therefore, the length of the first hoop layer 300 may be 40% to 60% of the length L of the cylinder part 110, and the length of the second hoop layer 400 may be 20% to 30% of the length L of the cylinder part 110.

More particularly, the center of the first hoop layer 300 corresponds to the center C of the cylinder part 110, and the length L1 of the first hoop layer 300 is defined by the following Equation 1.

$$L1=L/2 \qquad \text{[Equation 1]}$$

(In this case, L is the length of the cylinder part 110.)

In addition, the length L2 of the second hoop layer 400 is defined by the following Equation 2.

$$L2=L/4 \qquad \text{[Equation 2]}$$

(In this case, L is the length of the cylinder part 110.)

This is derived from the fact that the hoop stress applied to the central region of the cylinder part 110 (the section in which the first hoop layer is formed) is highest and the hoop stress applied to the two edge regions of the cylinder part 110 (the sections in which the second hoop layers are formed) is gradually decreased as the distance from the side parts 120 is decreased.

The stress (hoop stress) applied to the cylinder part 110 is not uniform over the entire section of the cylinder part 110.

Figure 8:
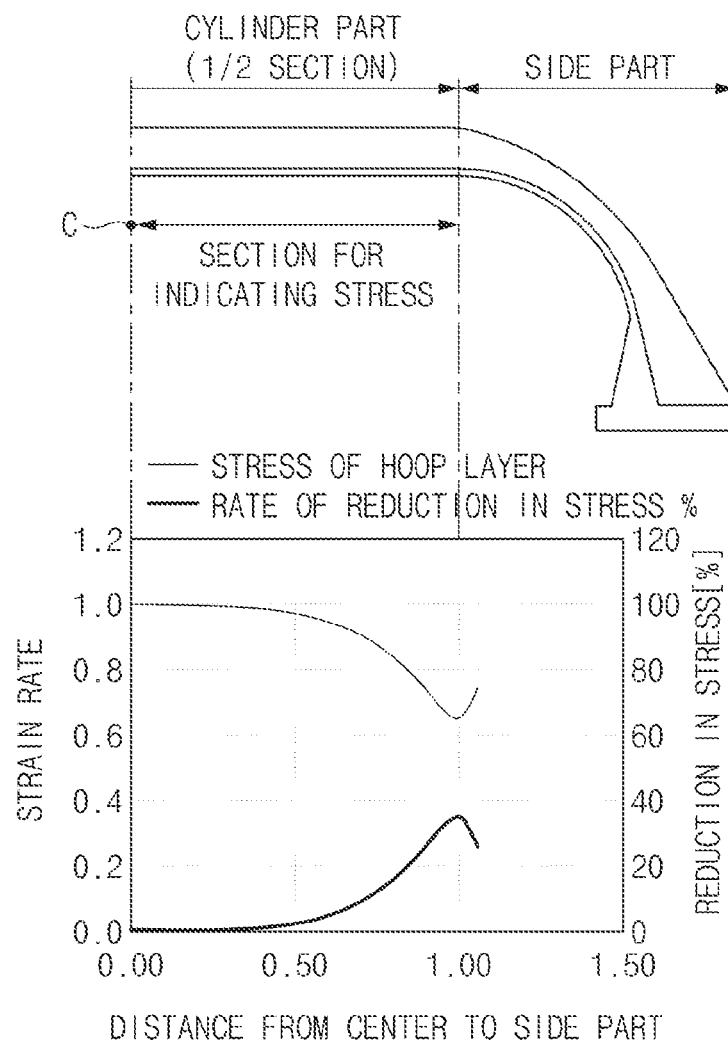
FIG. 8 is a view for explaining hoop stress applied to a cylinder part of the pressure vessel according to an exemplary embodiment of the present disclosure.
Figure 9:
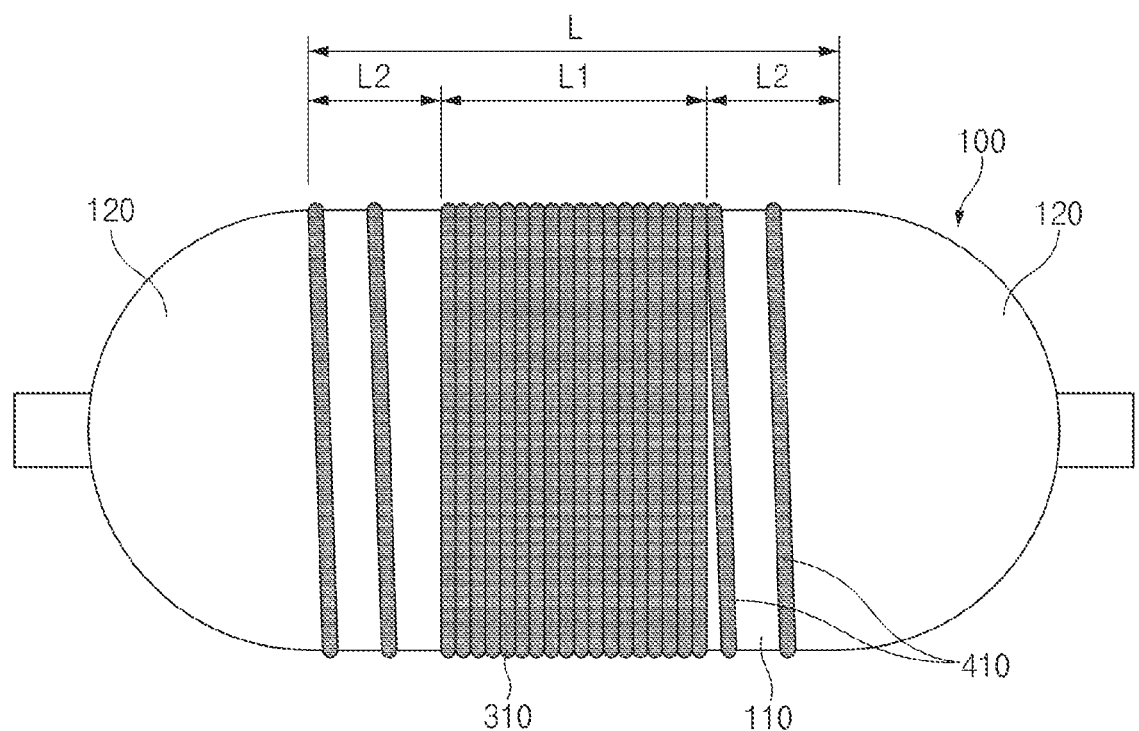
FIGS. 9 to 12 are views for explaining a modified example of the first hoop layer forming step and the second hoop layer forming step of the method of manufacturing a pressure vessel according to an exemplary embodiment of the present disclosure.
Figure 10:
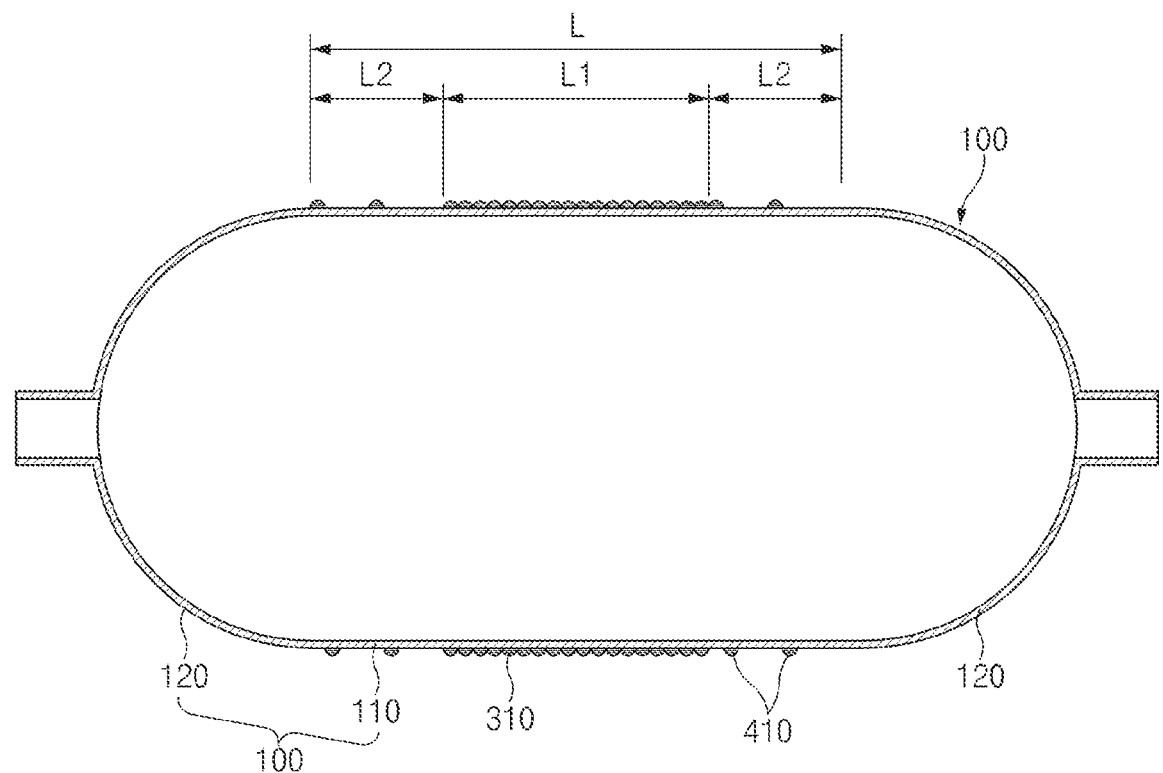
Figure 11:
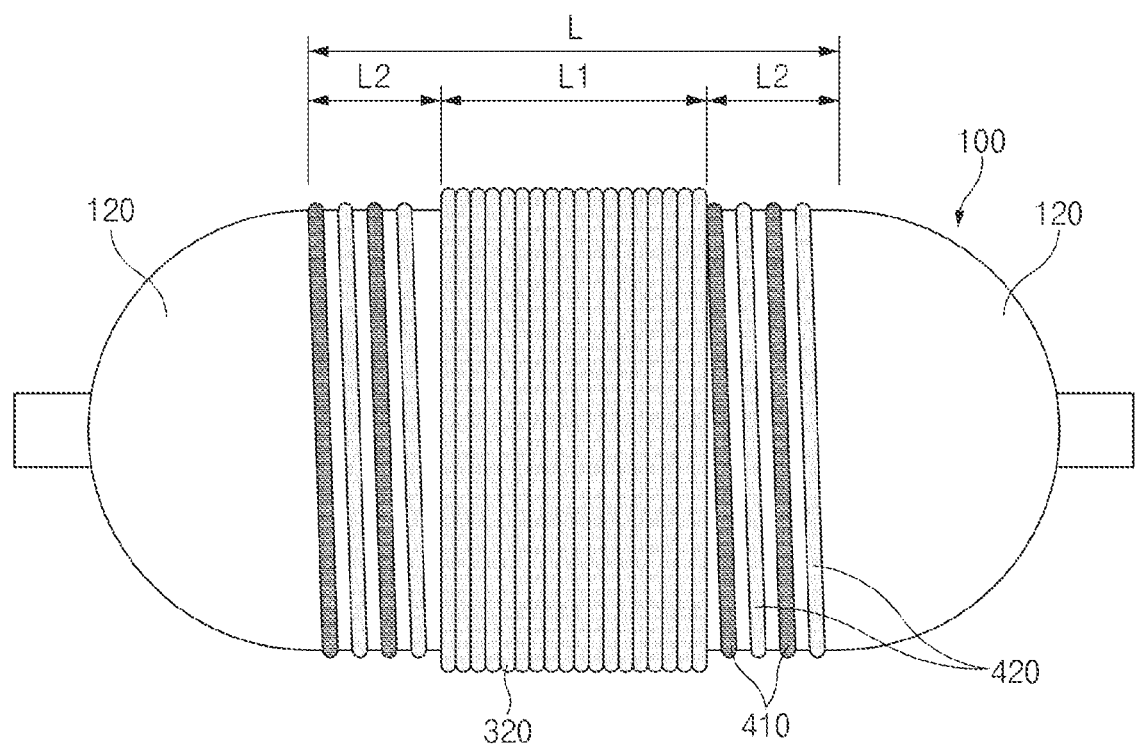
Figure 12:
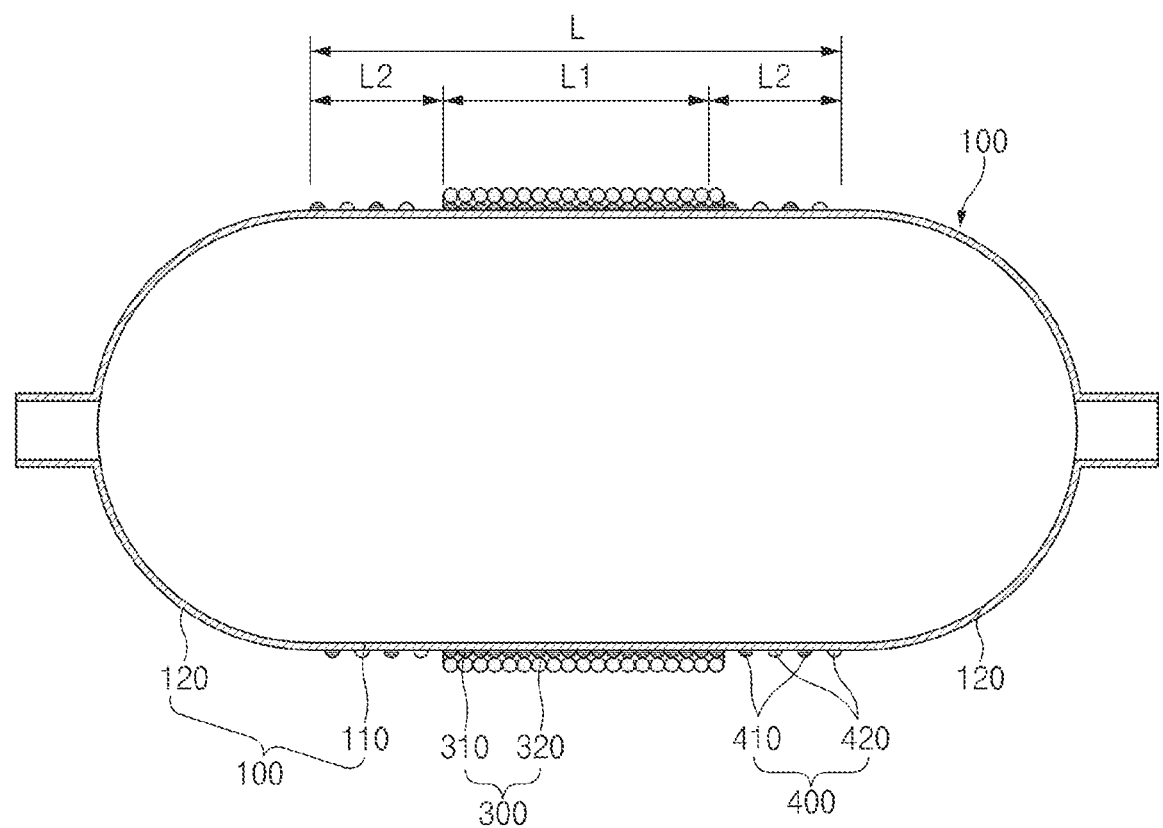

That is, referring to FIG. 8, it can be ascertained that the stress (hoop stress) applied to the cylinder part 110 is high in the central region of the cylinder part 110 (the region where the distance from the center C of the cylinder part is 0.00 to 0.50), and the stress (hoop stress) applied to the cylinder part 110 is gradually decreased in the edge region of the cylinder part 110 (the region where the distance from the center of the cylinder part is 0.50 to 1.00) as the distance from the side parts 120 is decreased.

In particular, it can be ascertained that the stress (maximum hoop stress) is concentrated in the central region of the cylinder part 110 (the region where the distance from the center of the cylinder part is 0.00 to 0.50) and the stress (hoop stress) is rapidly decreased in the edge region of the cylinder part 110 (the region where the distance from the center of the cylinder part is 0.50 to 1.00).

In an exemplary embodiment of the present disclosure as described above, the thickness of the first hoop layer 300, which is formed in the section to which the relatively high hoop stress is applied (in the central region of the cylinder part where the hoop stress is concentrated), is large, whereas the thickness of the second hoop layer 400, which is formed in the section to which the relatively low hoop stress is applied (in the edge region of the cylinder part), is small. As a result, it is possible to ensure sufficient structural rigidity against the hoop stress applied to the cylinder part 110, and it is possible to reduce the amount of use of the carbon fiber composite material, which is used to form the second hoop layer 400, to the extent that the thickness of the second hoop layer 400 is reduced. As a result, it is possible to obtain an advantageous effect of reducing a weight of the pressure vessel 10 and reducing manufacturing costs.

For reference, in the exemplary embodiment of the present disclosure, the order and the method of forming the first hoop layer 300 and the second hoop layer 400 may be variously changed in accordance with required conditions and design specifications, and the present disclosure is not restricted or limited by the order and the method of forming the first hoop layer 300 and the second hoop layer 400.

For example, the first hoop layer 300 and the second hoop layer 400 may be formed by separate winding processes, respectively. For example, the first hoop layer 300 may be formed first, and then the second hoop layer 400 may be formed. Alternatively, the second hoop layer 400 may be formed first, and then the first hoop layer 300 may be formed.

As another example, the first hoop layer 300 and the second hoop layer 400 may be continuously formed by a single winding process. For example, it is possible to continuously form one part of the second hoop layer 400 while forming one part of the first hoop layer 300 during a first winding process, and it is possible to continuously form the other part of the second hoop layer 400 while forming the other part of the first hoop layer 300 during a second winding process.

Figure 2:
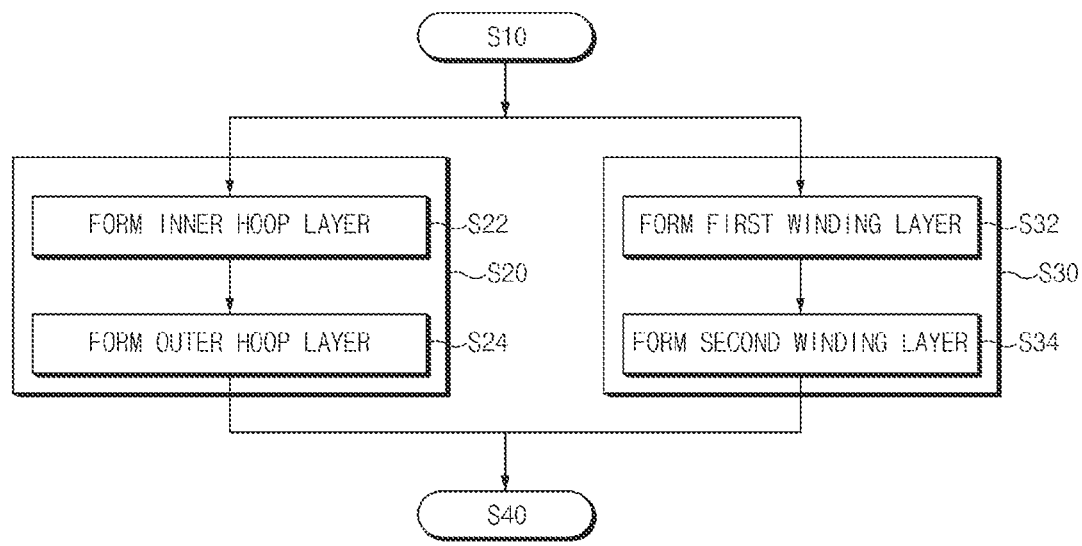
FIG. 2 is a block diagram for explaining a first hoop layer forming step and a second hoop layer forming step of the method of manufacturing a pressure vessel according to an exemplary embodiment of the present disclosure.

Referring to FIG. 2, according to an exemplary embodiment of the present disclosure, the first hoop layer forming step S20 may include an inner hoop layer forming step S22 of forming an inner hoop layer 310 that surrounds the outer circumferential surface of the cylinder part 110 and an outer hoop layer forming step S24 of forming an outer hoop layer 320 that surrounds an outer surface of the inner hoop layer 310. In addition, the second hoop layer forming step S30 may include a first winding layer forming step S32 of winding a first winding layer 410 around the outer circumferential surface of the cylinder part 110 and a second winding layer forming step S34 of winding a second winding layer 420 around the outer circumferential surface of the cylinder part 110 so as to define the same layer as the first winding layer 410.

In particular, the inner hoop layer 310 and the first winding layer 410 may be formed first, and then the outer hoop layer 320 and the second winding layer 420 may be formed.

Figure 3:
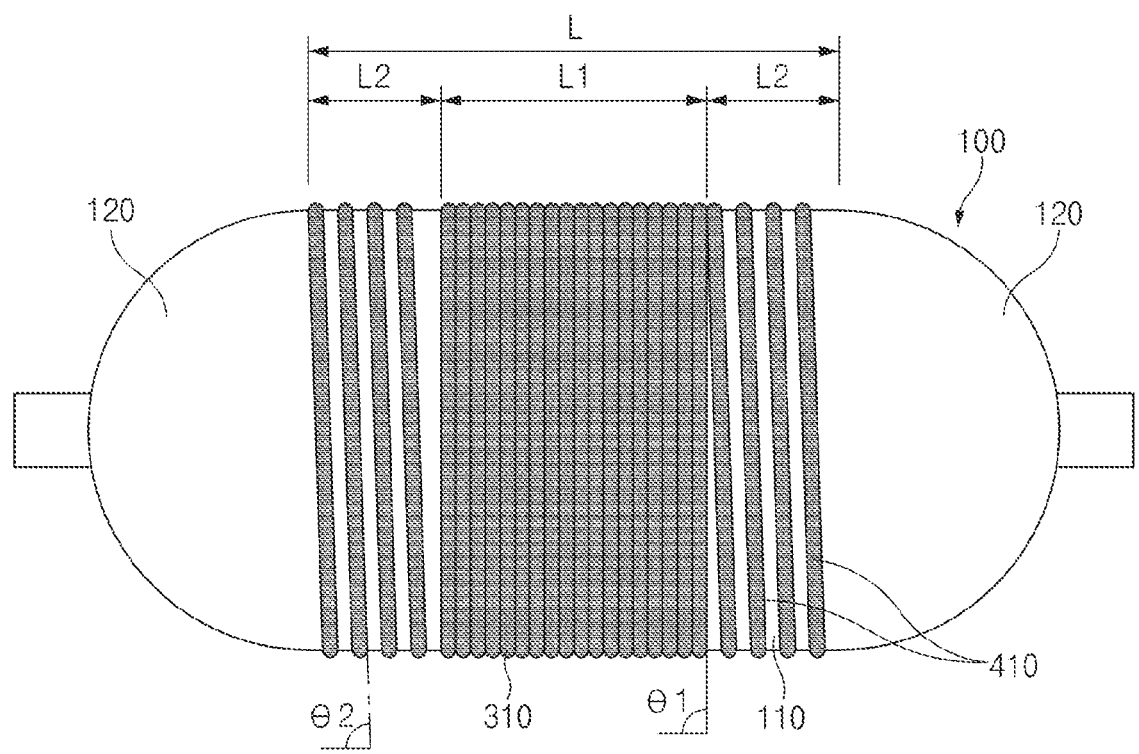
FIG. 3 is a top plan view for explaining an inner hoop layer and a first winding layer of a pressure vessel according to an exemplary embodiment of the present disclosure.
Figure 4:
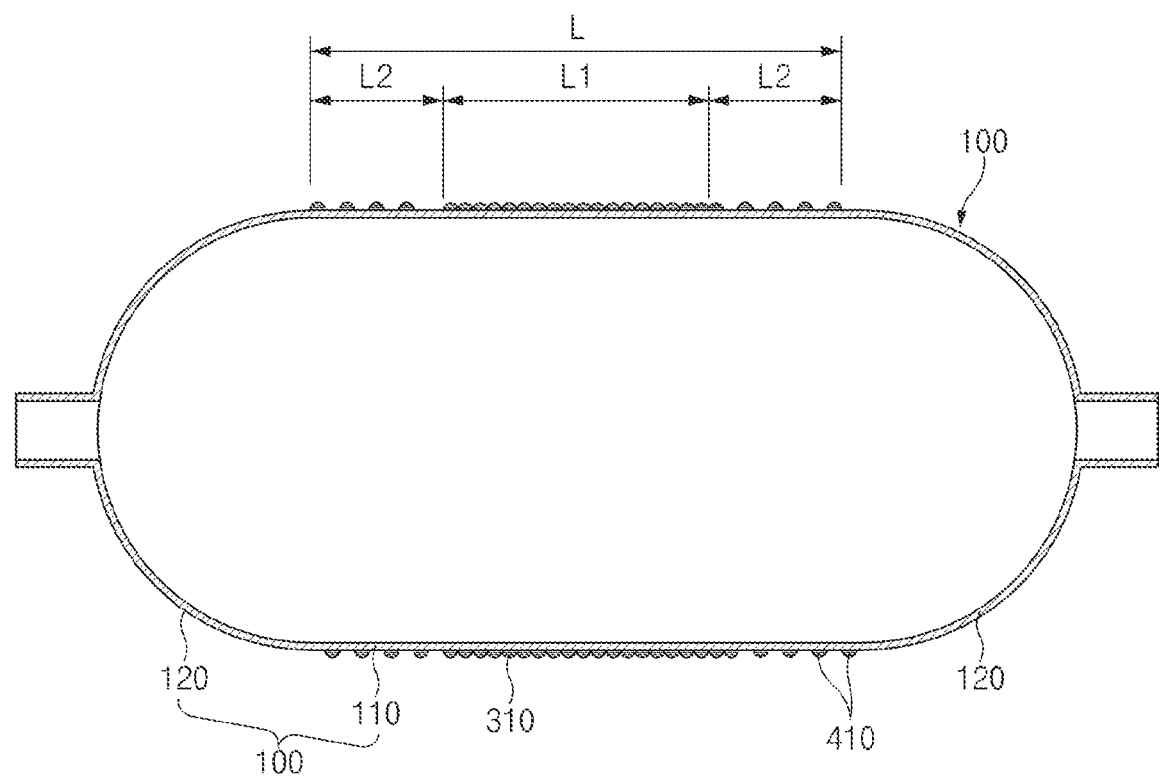
FIG. 4 is a cross-sectional view for explaining the inner hoop layer and the first winding layer of the pressure vessel according to an exemplary embodiment of the present disclosure.

More specifically, referring to FIGS. 3 and 4, in the first winding process (primary winding process), the inner hoop layer 310 may be formed in the central region of the cylinder part 110 and the first winding layers 410 may be formed in the two edge regions of the cylinder part 110.

In this case, the inner hoop layer 310 may constitute a part of the first hoop layer 300, and the first winding layer 410 may constitute a part of the second hoop layer 400.

Figure 5:
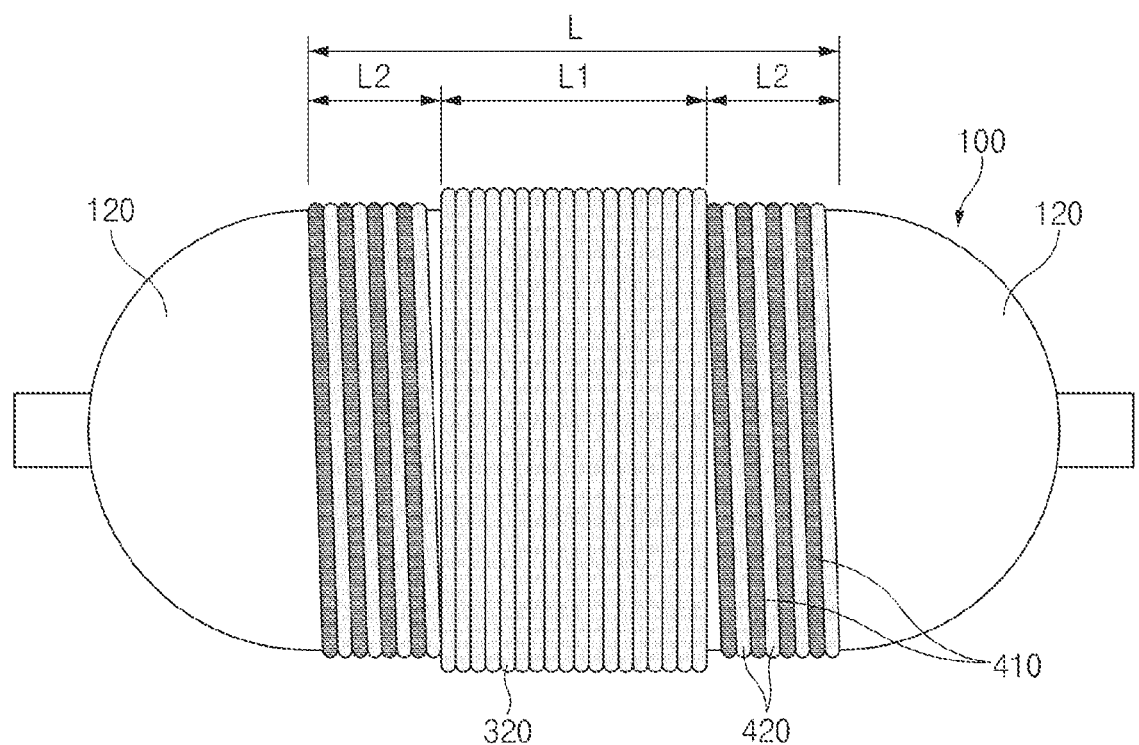
FIG. 5 is a top plan view for explaining an outer hoop layer and a second winding layer of the pressure vessel according to an exemplary embodiment of the present disclosure.
Figure 6:
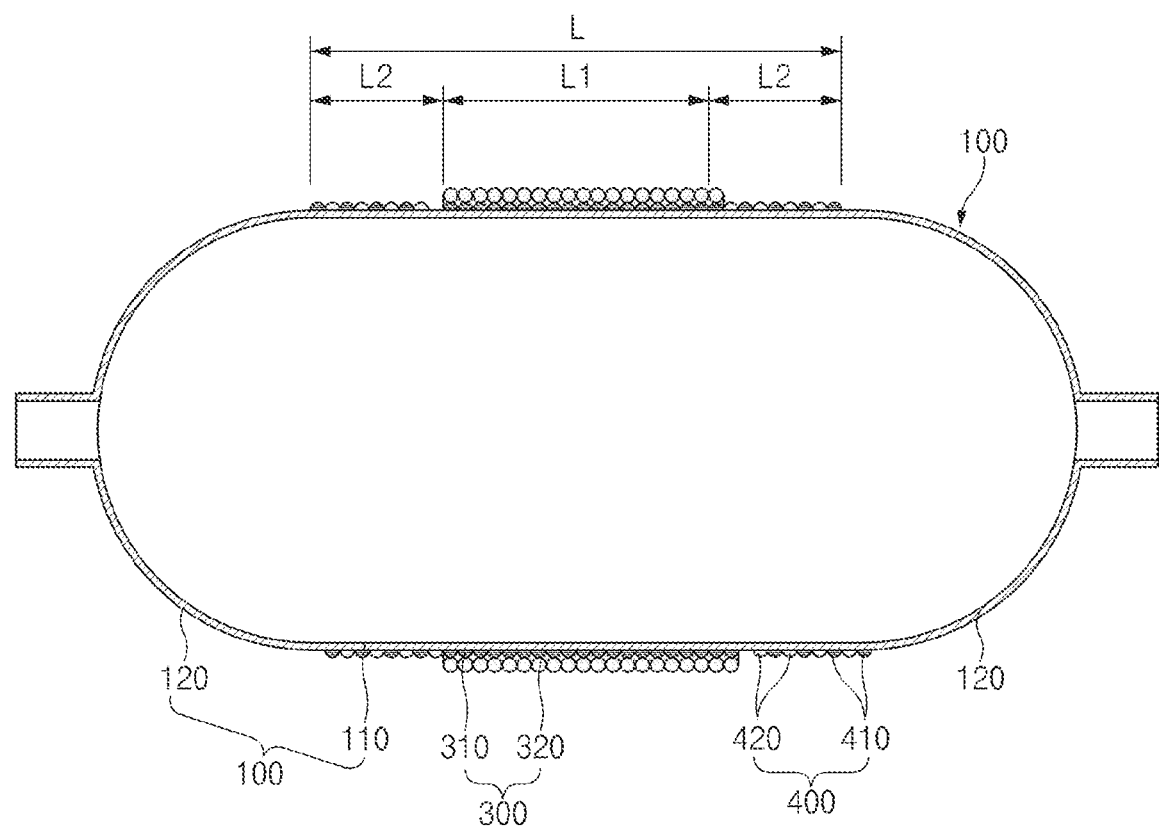
FIG. 6 is a cross-sectional view for explaining the outer hoop layer and the second winding layer of the pressure vessel according to an exemplary embodiment of the present disclosure.

Next, referring to FIGS. 5 and 6, in the second winding process (secondary winding process), the outer hoop layer 320 may be formed to surround the outer surface of the inner hoop layer 310 and the second winding layer 420 may be formed to define the same layer as the first winding layer 410.

The outer hoop layer 320, together with the inner hoop layer 310, may form the first hoop layer 300, and the second winding layer 420, together with the first winding layer 410, may form the second hoop layer 400.

In particular, the outer hoop layer 320 and the inner hoop layer 310, which constitute the first hoop layer 300, may be formed by winding the carbon fiber composite material at the first winding angle θ1, and the first winding layer 410 and the second winding layer 420, which constitute the second hoop layer 400, may be formed by winding the carbon fiber composite material at the second winding angle θ2 different from the first winding angle θ1.

For example, the second winding angle θ2 is defined as an angle smaller than the first winding angle θ1. For example, the first winding angle θ1 is 89° to 91°, and the second winding angle θ2 is larger than 85° and smaller than 89°.

Since the second winding angle θ2 is smaller than the first winding angle θ1 as described above, it is possible to ensure a predetermined space (the section where no carbon fiber composite material is wound) between the adjacent first winding layers 410 during the first winding process (primary winding process), and the second winding layer 420 is wound in the space between the adjacent first winding layers 410 during the second winding process (secondary winding process), such that the first winding layer 410 and the second winding layer 420 may be in close contact with each other and disposed alternately in a longitudinal direction of the cylinder part 110 while defining the same layer.

In an exemplary embodiment of the present disclosure described and illustrated above, the example in which the first hoop layer 300 having the two-layer structure including the two hoop layers (e.g., the inner hoop layer and the outer hoop layer) is formed in the inner hoop layer forming step (S22) has been described. However, according to another exemplary embodiment of the present disclosure, the first hoop layer may be formed by stacking three or more hoop layers.

In an exemplary embodiment of the present disclosure described and illustrated above, the example in which the first winding layer 410 and the second winding layer 420 are in close contact with each other to define the same layer has been described. However, according to another exemplary embodiment of the present disclosure, the first winding layer and the second winding layer may be disposed to be spaced apart from each other in the longitudinal direction of the cylinder part.

For example, referring to FIGS. 9 to 12, a size of the space formed between the adjacent first winding layers 410 may be adjusted (for example, the size of the space may be increased), by changing the second winding angle. The first winding layer 410 and the second winding layer 420 may be spaced apart from each other and disposed alternately in the longitudinal direction of the cylinder part 110 while defining the same layer.

Figure 7:
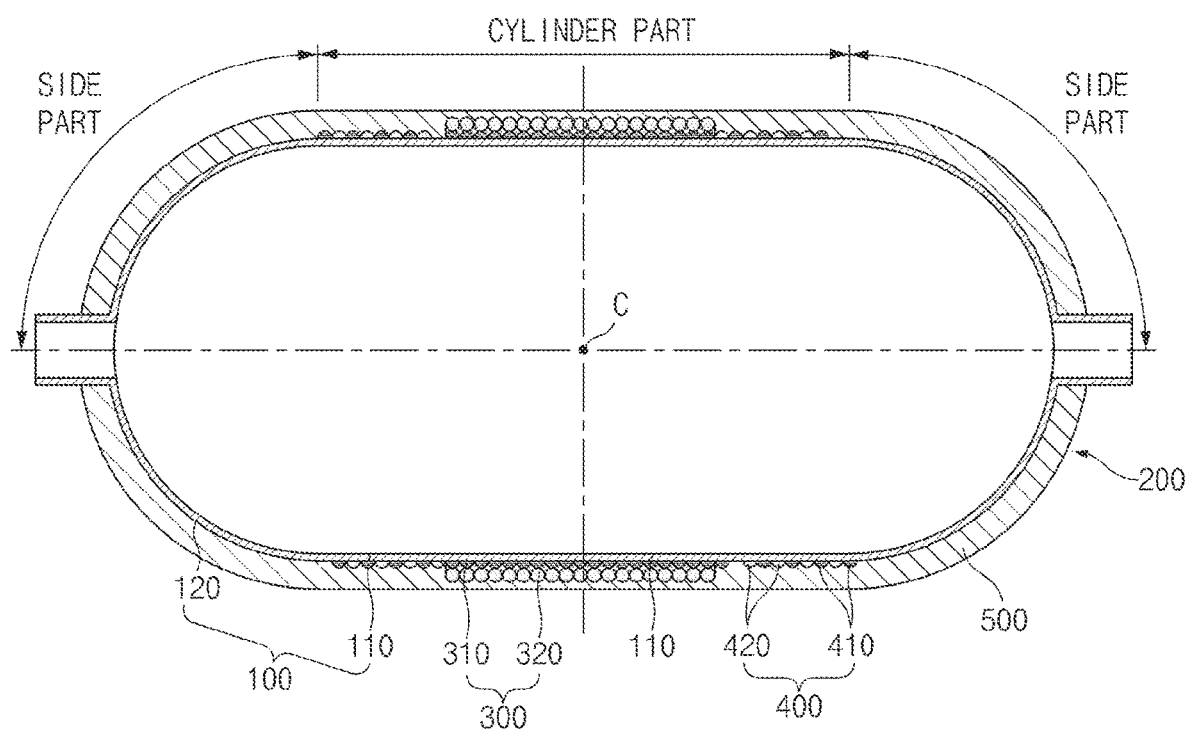
FIG. 7 is a view for explaining a helical layer of the pressure vessel according to an exemplary embodiment of the present disclosure.

Step 4:

Referring to FIGS. 1 and 7, according to an exemplary embodiment of the present disclosure, the method of manufacturing a pressure vessel may include a helical layer forming step S40 of forming a helical layer 500 that surrounds an outer surface of the first hoop layer 300, outer surfaces of the second hoop layers 400, and outer surfaces of the side parts 120.

In the helical layer forming step S40, the helical layer 500 may be formed by winding a carbon fiber composite material, which is made by impregnating carbon fibers with epoxy, thermosetting resin, and the like, around the outer surface of the first hoop layer 300, the outer surfaces of the second hoop layers 400, and the outer surfaces of the side parts 120 by using the typical winding device.

For reference, in an exemplary embodiment of the present disclosure, the helical layer 500 may be defined as a layer for (ensuring structural rigidity) resisting stress and torsion mainly applied in the longitudinal direction among types of stress applied to the cylinder part 110.

For example, the helical layer 500 may be formed by winding the carbon fiber composite material around the outer surface of the cylinder part 110 at a winding angle of 45° to 88° with respect to the axis of the cylinder part 110, and the present disclosure is not restricted or limited by winding patterns (e.g., clockwise winding, counterclockwise winding, oblique winding, and the like) of the carbon fiber composite material for forming the helical layer 500.

Hereinafter, the pressure vessel 10 manufactured by the method of manufacturing a pressure vessel according to an exemplary embodiment of the present disclosure will be described.

Referring to FIG. 7, the pressure vessel 10 according to an exemplary embodiment of the present disclosure includes the liner 100 including the cylinder part 110, and the side parts 120 provided at both ends of the cylinder part 110 and each having a dome shape, and a carbon fiber layer 200 including the first hoop layer 300 provided to surround a part of the outer circumferential surface of the cylinder part 110, and the second hoop layers 400 provided to surround the other parts of the outer circumferential surface of the cylinder part 110 and each having a thickness different from a thickness of the first hoop layer 300.

The liner 100 includes the cylinder part 110 having a hollow cylindrical shape, and the dome-shaped side parts 120 integrally formed at both ends of the cylinder part 110.

The liner 100 has a hollow structure having a storage space therein, and high-pressure compressed hydrogen may be stored in the storage space.

The material of the liner 100 may be variously changed in accordance with required conditions and design specifications, and the present disclosure is not limited or restricted by the material of the liner 100. In particular, the liner 100 may be made of a nonmetallic material such as high-density plastic with excellent restoring force and excellent fatigue resistance.

The first hoop layer 300 is provided to surround a part of the outer circumferential surface of the cylinder part 110.

For reference, in an exemplary embodiment of the present disclosure, the first hoop layer 300 may be defined as a layer for (ensuring structural rigidity) resisting stress (e.g., maximum hoop stress) mainly applied in the circumferential direction among types of stress applied to the cylinder part 110.

The first hoop layer 300 may be formed by winding the carbon fiber composite material, which is made by impregnating carbon fibers with epoxy, thermosetting resin, and the like, around the outer surface (outer circumferential surface) of the cylinder part 110 by using the typical winding device.

For example, the first hoop layer 300 may be formed by winding the carbon fiber composite material around the outer surface of the cylinder part 110 at the winding angle (first winding angle) of 89° to 91° with respect to the axis of the cylinder part 110.

In particular, the first hoop layer 300 may be formed to have the first thickness T1 that may resist maximum hoop stress applied to the cylinder part 110. The first thickness T1 of the first hoop layer 300 may be variously changed in accordance with required conditions and design specifications (e.g., the structure and the size of the pressure vessel 10).

The second hoop layers 400 are provided to surround the other parts of the outer circumferential surface of the cylinder part 110.

For reference, in an exemplary embodiment of the present disclosure, the second hoop layer 400 may be defined as a layer for (ensuring structural rigidity) resisting stress (hoop stress) mainly applied in the circumferential direction among types of stress applied to the cylinder part 110.

The second hoop layer 400 may be formed by winding the carbon fiber composite material, which is made by impregnating carbon fibers with epoxy, thermosetting resin, and the like, around the outer surface (outer circumferential surface) of the cylinder part 110 by using the typical winding device.

For example, the second hoop layer 400 may be formed by winding the carbon fiber composite material around the outer surface of the cylinder part 110 at the winding angle (second winding angle) of 85° to 89° with respect to the axis of the cylinder part 110.

In particular, the second hoop layer 400 may be formed to have the second thickness T2 smaller than the first thickness T1 of the first hoop layer 300. More particularly, the second thickness T2 of the second hoop layer 400 may be defined to be ½ or less of the first thickness T1 (the thickness of the first hoop layer).

According to an exemplary embodiment of the present disclosure, the first hoop layer 300 is provided to surround the central region of the cylinder part 110, and the second hoop layers 400 are provided to surround the two edge regions of the cylinder part 110 with the first hoop layer 300 interposed therebetween.

In particular, the center of the first hoop layer 300 corresponds to the center C of the cylinder part, the length of the first hoop layer 300 is 40% to 60% of the length L of the cylinder part 110, and the length of the second hoop layer 400 is 20% to 30% of the length L of the cylinder part 110.

More particularly, the center of the first hoop layer 300 corresponds to the center C of the cylinder part 110, and the length L1 of the first hoop layer 300 is defined by the following Equation 1.

$$L1 = L/2 \quad \text{[Equation 1]}$$

(In this case, L is the length of the cylinder part 110.)

In addition, the length L2 of the second hoop layer 400 is defined by the following Equation 2.

$$L2 = L/4 \quad \text{[Equation 2]}$$

(In this case, L is the length of the cylinder part 110.)

This is derived from the fact that the hoop stress applied to the central region of the cylinder part 110 (the section in which the first hoop layer is formed) is highest and the hoop stress applied to two edge regions of the cylinder part 110 (the sections in which the second hoop layers 400 are formed) is gradually decreased as the distance from the side parts 120 is decreased.

The stress (hoop stress) applied to the cylinder part 110 is not uniform over the entire section of the cylinder part 110.

That is, referring to FIG. 8, it can be ascertained that the stress (hoop stress) applied to the cylinder part 110 is high in the central region of the cylinder part 110 (the region where the distance from the center of the cylinder part is 0.00 to 0.50), and the stress (hoop stress) applied to the cylinder part 110 is gradually decreased in the edge region of the cylinder part 110 (the region where the distance from the center of the cylinder part is 0.50 to 1.00) as the distance from the side parts 120 is decreased.

In particular, it can be ascertained that the stress (maximum hoop stress) is concentrated in the central region of the cylinder part 110 (the region where the distance from the center of the cylinder part is 0.00 to 0.50) and the stress (hoop stress) is rapidly decreased in the edge region of the cylinder part 110 (the region where the distance from the center of the cylinder part is 0.50 to 1.00).

In an exemplary embodiment of the present disclosure as described above, the thickness of the first hoop layer 300, which is formed in the section to which the relatively high hoop stress is applied (in the central region of the cylinder part where the hoop stress is concentrated), is large, whereas the thickness of the second hoop layer 400, which is formed in the section to which the relatively low hoop stress is applied (in the edge region of the cylinder part), is small. As a result, it is possible to ensure sufficient structural rigidity against the hoop stress applied to the cylinder part 110, and it is possible to reduce the amount of use of the carbon fiber composite material, which is used to form the second hoop layer 400, to the extent that the thickness of the second hoop layer 400 is reduced. As a result, it is possible to obtain an advantageous effect of reducing a weight of the pressure vessel 10 and reducing manufacturing costs.

For reference, in an exemplary embodiment of the present disclosure, the order and the method of forming the first hoop layer 300 and the second hoop layer 400 may be variously changed in accordance with required conditions and design specifications, and the present disclosure is not restricted or limited by the order and the method of forming the first hoop layer 300 and the second hoop layer 400.

For example, the first hoop layer 300 may include the inner hoop layer 310 provided to surround the outer circumferential surface of the cylinder part 110, and the outer hoop layer 320 provided to surround the outer surface of the inner hoop layer 310. The second hoop layer 400 may include the first winding layer 410 wound around the outer circumferential surface of the cylinder part 110, and the second winding layer 420 wound around the outer circumferential surface of the cylinder part 110 so as to define the same layer as the first winding layer 410.

For example, the inner hoop layer 310 and the first winding layer 410 may be formed first on the outer surface of the cylinder part 110. In this case, the inner hoop layer 310 may constitute a part of the first hoop layer 300, and the first winding layer 410 may constitute a part of the second hoop layer 400.

Thereafter, the outer hoop layer 320 may be formed on the outer surface of the inner hoop layer 310, and the second winding layer 420 may be formed on the outer surface of the cylinder part 110 (for example, in the space between the first winding layers 410). The outer hoop layer 320, together with the inner hoop layer 310, may form the first hoop layer 300, and the second winding layer 420, together with the first winding layer 410, may form the second hoop layer 400.

In particular, the outer hoop layer 320 and the inner hoop layer 310, which constitute the first hoop layer 300, may be formed by winding the carbon fiber composite material at the first winding angle θ1, and the first winding layer 410 and the second winding layer 420, which constitute the second hoop layer 400, may be formed by winding the carbon fiber composite material at the second winding angle θ2 different from the first winding angle.

For example, the second winding angle θ2 is defined as an angle smaller than the first winding angle θ1. For example, the first winding angle θ1 is 89° to 91°, and the second winding angle θ2 is larger than 85° and smaller than 89°.

Since the second winding angle θ2 is smaller than the first winding angle θ1 as described above, it is possible to ensure a predetermined space (the section where 110 carbon fiber composite material is wound) between the adjacent first winding layers 410 during the first winding process (primary winding process), and the second winding layer 420 is wound in the space between the adjacent first winding layers 410 during the second winding process (secondary winding process), such that the first winding layer 410 and the second winding layer 420 may be in close contact with each other and disposed alternately in the longitudinal direction of the cylinder part 110 while defining the same layer.

In an exemplary embodiment of the present disclosure described and illustrated above, the example in which the first winding layer 410 and the second winding layer 420 are in close contact with each other to define the same layer has been described. However, according to another exemplary embodiment of the present disclosure, the first winding layer and the second winding layer may be disposed to be spaced apart from each other in the longitudinal direction of the cylinder part.

For example, referring to FIGS. 9 to 12, the size of the space formed between the adjacent first winding layers 410 may be adjusted (for example, the size of the space may be increased), by changing the second winding angle. The first winding layer 410 and the second winding layer 420 may be spaced apart from each other and disposed alternately in the longitudinal direction of the cylinder part 110 while defining the same layer.

According to an exemplary embodiment of the present disclosure, the pressure vessel 10 may include the helical layer 500 that surrounds the outer surface of the first hoop layer 300, the outer surfaces of the second hoop layers 400, and the outer surfaces of the side parts 120.

For reference, in an exemplary embodiment of the present disclosure, the helical layer 500 may be defined as a layer for (ensuring structural rigidity) resisting stress and torsion mainly applied in the longitudinal direction among types of stress applied to the cylinder part 110.

The helical layer 500 may be formed by winding a carbon fiber composite material, which is made by impregnating carbon fibers with epoxy, thermosetting resin, and the like around the outer surface of the first hoop layer 300, the outer surfaces of the second hoop layers 400, and the outer surfaces of the side pails 120 by using the typical winding device.

For example, the helical layer 500 may be formed by winding the carbon fiber composite material around the outer surface of the cylinder part 110 at the winding angle of 45° to 88° with respect to the axis of the cylinder part 110.

Meanwhile, the carbon fiber layer 200 (the first hoop layer, the second hoop layers, and the helical layer) wound around the outer surface of the liner 100 may be cured through a subsequent heat treatment process.

In an exemplary embodiment of the present disclosure described and illustrated above, the example in which the pressure vessel includes the single carbon fiber layer including the first hoop layer, the second hoop layers, and the helical layer has been described. However, according to another exemplary embodiment of the present disclosure, the pressure vessel may include a plurality of carbon fiber layers.

Figure 13:
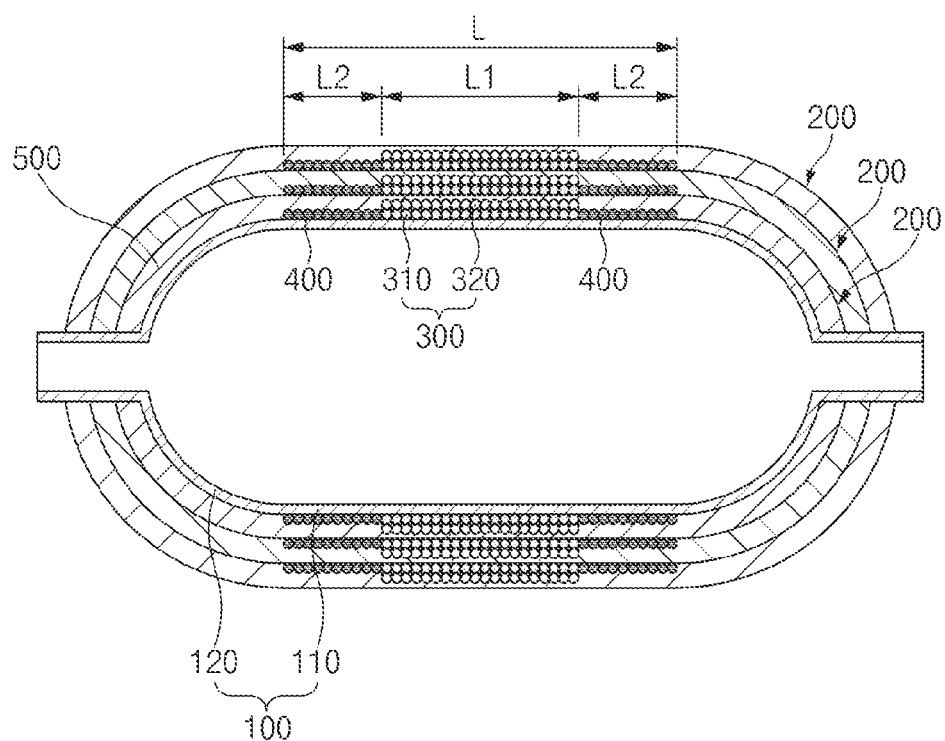
FIGS. 13 to 16 are views for explaining an example in which carbon fiber layers of the pressure vessel according to an exemplary embodiment of the present disclosure are stacked.

For example, referring to FIG. 13, the pressure vessel 10 includes the liner 100 including the cylinder part 110, and the dome-shaped side parts 120 provided at both ends of the cylinder part 110, and the carbon fiber layer 200 including the first hoop layer 300 provided to surround a part of the outer circumferential surface of the cylinder part 110, the second hoop layers 400 provided to surround the other parts of the outer circumferential surface of the cylinder part 110 and each having a thickness different from a thickness of the first hoop layer 300, and the helical layer 500 provided to surround the outer surface of the first hoop layer 300, the outer surfaces of the second hoop layers 400, and the outer surfaces of the side parts 120. Further, the plurality of carbon fiber layers 200 may be stacked (in a radial direction of the liner).

The number of stacked carbon fiber layers 200 may be variously changed in accordance with required conditions and design specifications, and the present disclosure is not restricted or limited by the number of stacked carbon fiber layers 200.

Hereinafter, an example in which three carbon fiber layers 200 are stacked on the outer surface of the liner 100 will be described. According to another exemplary embodiment of the present disclosure, two carbon fiber layers may be stacked on the outer surface of the liner or four or more carbon fiber layers may be stacked on the outer surface of the liner.

For reference, in an exemplary embodiment of the present disclosure described and illustrated above, the example in which the second hoop layer is formed through the two winding processes has been described. However, according to another exemplary embodiment of the present disclosure, the second hoop layer may be formed through a single winding process.

Figure 14:
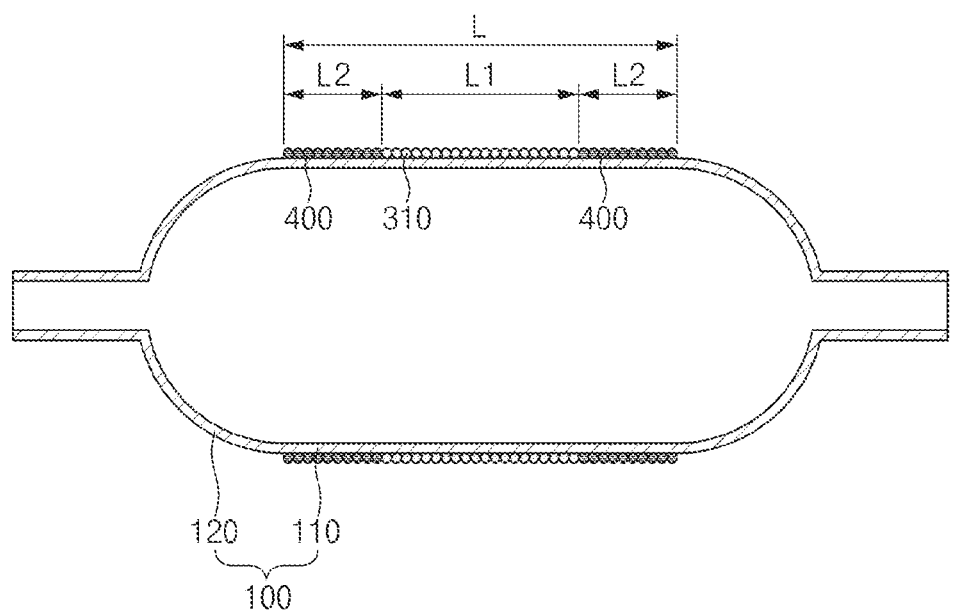

That is, referring to FIG. 14, according to an exemplary embodiment of the present disclosure, in the first winding process (primary winding process), the inner hoop layer 310 (a part of the first hoop layer) may be formed in the central region of the cylinder part 110 and the second hoop layers 400 (e.g., the structures including both the first winding layer and the second winding layer) may be formed in the two edge regions of the cylinder part 110.

Figure 15:
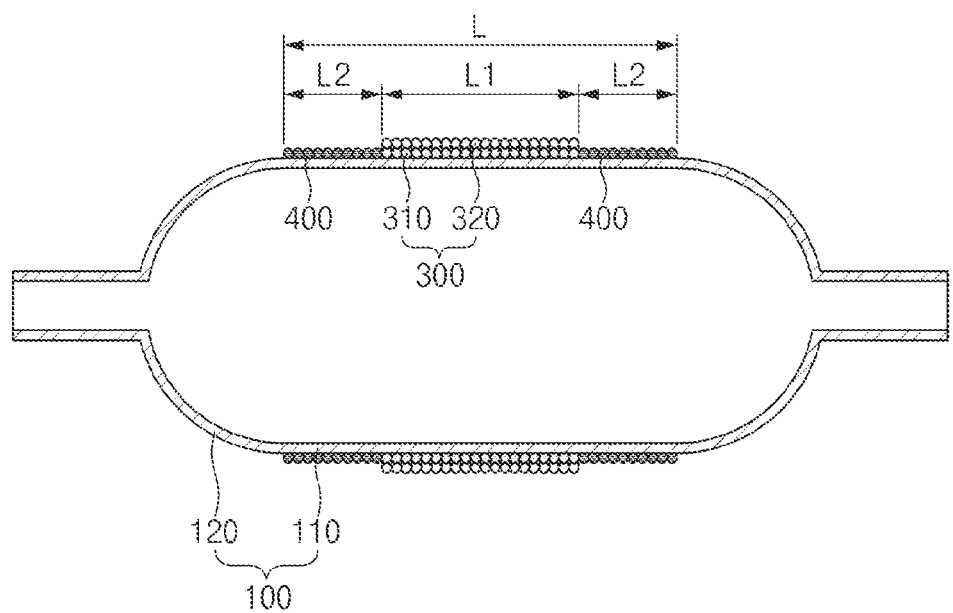

Next, referring to FIG. 15, in the second winding process (secondary winding process), the outer hoop layer 320 (the other part of the first hoop layer) may be formed in the central region of the cylinder part 110.

Figure 16:
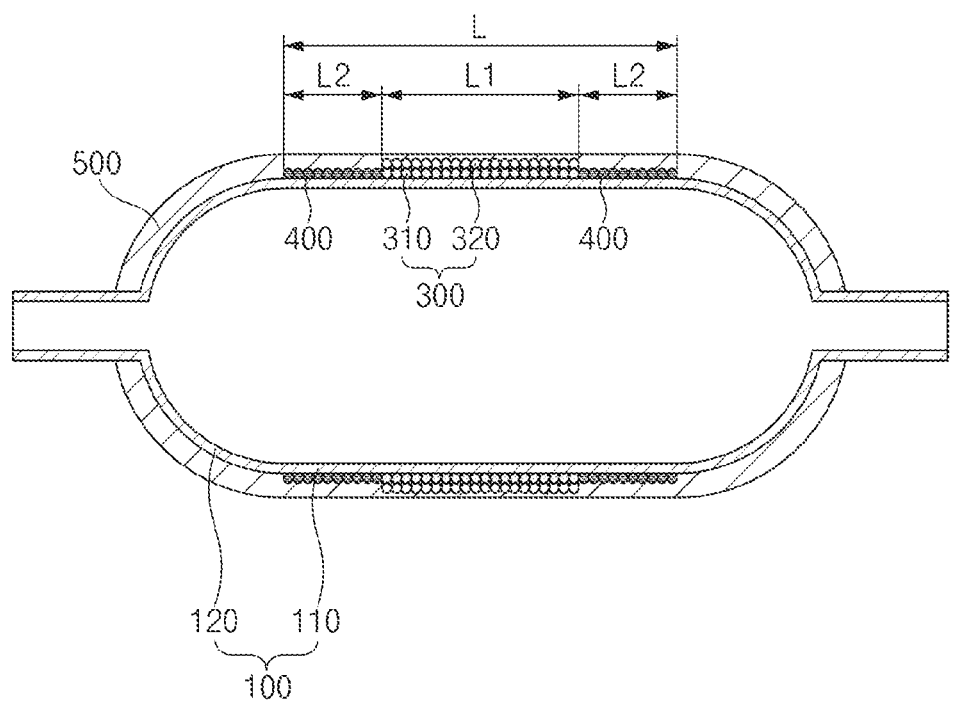

Thereafter, as illustrated in FIG. 16, in a third winding process (tertiary winding process), the helical layer 500 may be formed on the outer surface of the first hoop layer 300, the outer surfaces of the second hoop layers 400, and the outer surfaces of the side parts 120.

In this manner as described above, the plurality of carbon fiber layers 200 may be stacked on the outer surface of the liner 100 by repeatedly performing the first winding process, the second winding process, and the third winding process which are illustrated in FIGS. 14 to 16.

In addition, in an exemplary embodiment described and illustrated above, the example in which the inner hoop layer and the second hoop layer are formed and then the outer hoop layer is formed has been described. However, according to another exemplary embodiment of the present disclosure, only the inner hoop layer may be formed first, and then the outer hoop layer and the second hoop layer may be formed.

Figure 17:
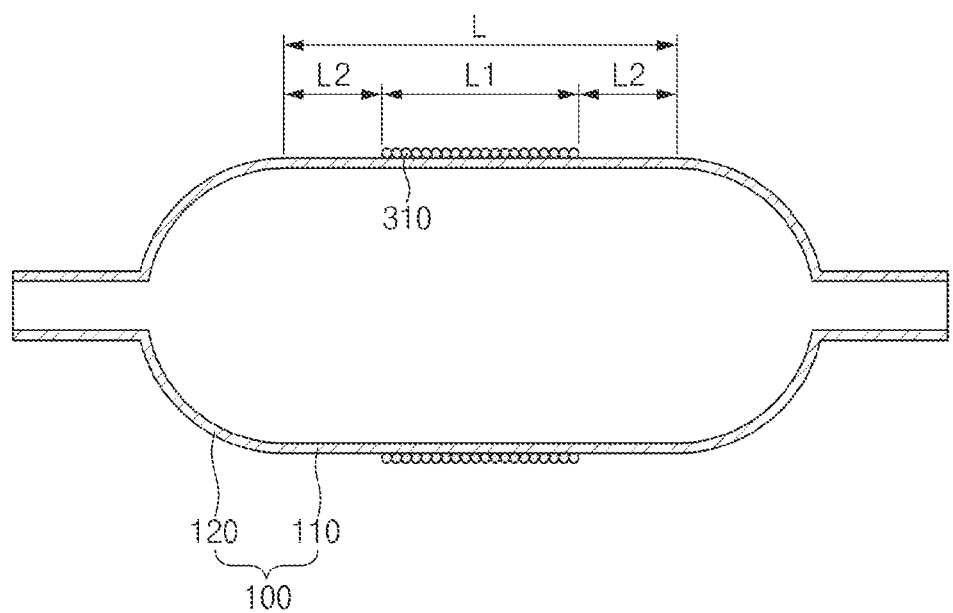
FIGS. 17 to 20 are views for explaining another example in which carbon fiber layers of the pressure vessel according to an exemplary embodiment of the present disclosure are stacked.

That is, referring to FIG. 17, according to an exemplary embodiment of the present disclosure, the inner hoop layer 310 (a part of the first hoop layer) may be formed first in the central region of the cylinder part 110 in the first winding process (primary winding process).

Figure 18:
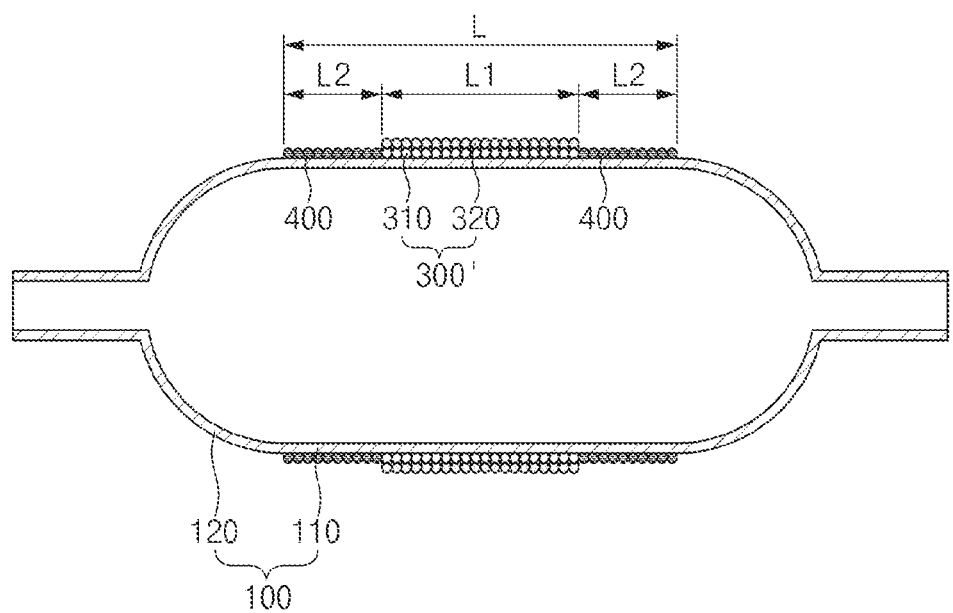

Next, referring to FIG. 18, in the second winding process (secondary winding process), the outer hoop layer 320 (the other part of the first hoop layer) may be formed in the central region of the cylinder part 110 and the second hoop layers 400 (e.g., the structure including both the first winding layer and the second winding layer) may be formed in the two edge regions of the cylinder part 110.

Figure 19:
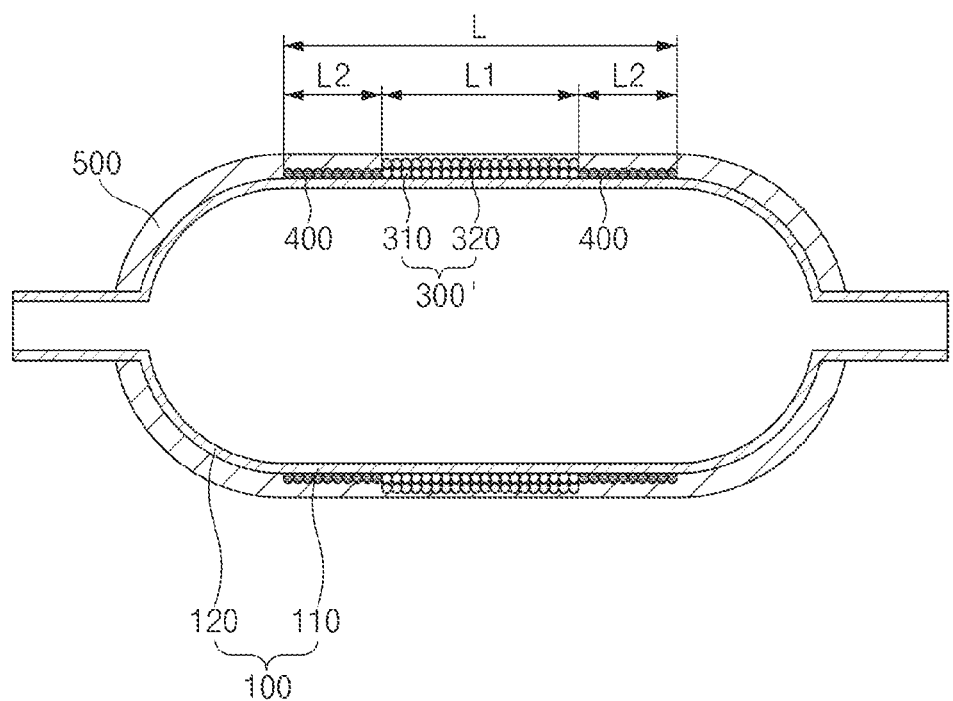

Thereafter, as illustrated in FIG. 19, in the third winding process (tertiary winding process), the helical layer 500 may be formed on the outer surface of the first hoop layer 300', the outer surfaces of the second hoop layers 400, and the outer surfaces of the side parts 120.

Figure 20:
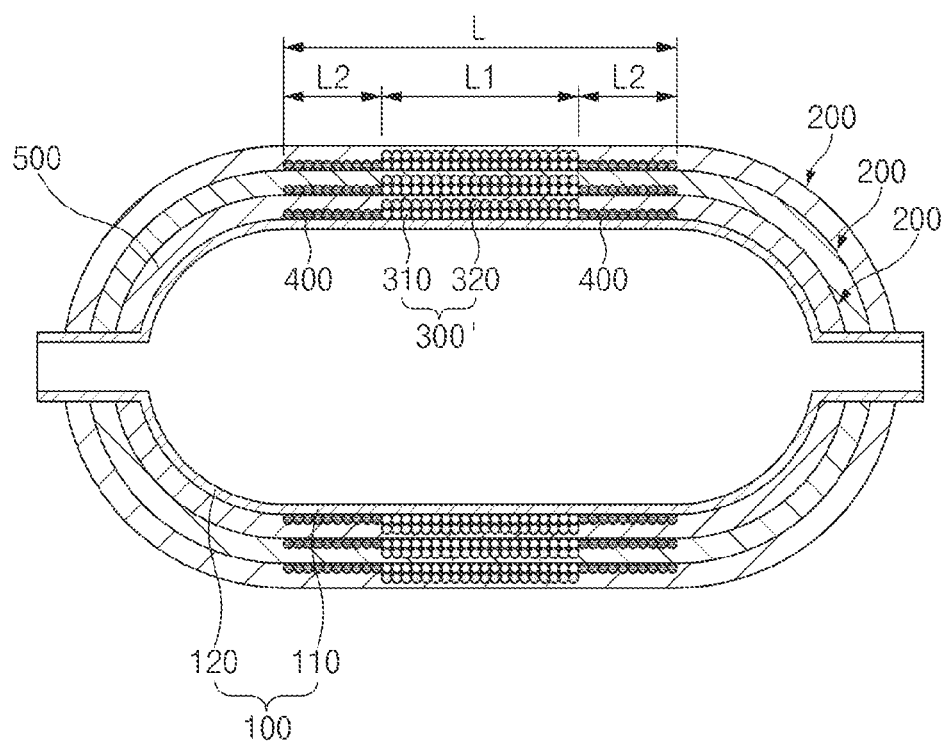

In this manner as described above, as illustrated in FIG. 20, the plurality of carbon fiber layers 200 including the first hoop layer 300', the second hoop layers 400, and the helical layer 500 may be stacked on the outer surface of the liner 100 by repeatedly performing the first winding process, the second winding process, and the third winding process which are illustrated in FIGS. 17 to 19.

According to the exemplary embodiments of the present disclosure as described above, it is possible to obtain an advantageous effect of ensuring structural rigidity and improving stability and reliability.

In particular, according to the exemplary embodiments of the present disclosure, it is possible to obtain an advantageous effect of ensuring structural rigidity of the pressure vessel and minimizing the amount of use of the carbon fiber composite material.

In addition, according to the exemplary embodiments of the present disclosure, it is possible to obtain an advantageous effect of reducing a weight of the pressure vessel and reducing manufacturing costs.

In addition, according to the exemplary embodiments of the present disclosure, it is possible to obtain an advantageous effect of simplifying a manufacturing process and improving manufacturing efficiency.

While the exemplary embodiments have been described above, the exemplary embodiments are just illustrative and not intended to limit the present disclosure. It can be appreciated by those skilled in the art that various modifications and alterations, which are not described above, may be made to the present exemplary embodiments without departing from the intrinsic features of the present exemplary embodiments. For example, the respective constituent elements specifically described in the exemplary embodiments may be modified and then carried out. Further, it should be interpreted that the differences related to the modifications and alterations are included in the scope of the present disclosure defined by the appended claims.

What is claimed is:

1. A pressure vessel comprising:
a liner comprising a cylinder part and side parts provided at both ends of the cylinder part, each side part having a dome shape; and
a carbon fiber layer comprising a first hoop layer surrounding a part of an outer circumferential surface of the cylinder part and second hoop layers surrounding other parts of the outer circumferential surface of the cylinder part, each of the second hoop layers having a smaller thickness than the first hoop layer, a first edge hoop layer surrounding a first edge region of the outer circumferential surface of the cylinder part, and a second edge hoop layer surrounding a second edge region of the outer circumferential surface of the cylinder part, wherein each of the first and the second edge hoop layers comprises
a first winding layer wound around the outer circumferential surface of the cylinder part, the first winding layer having the thickness of the each of the first and the second edge hoop layers, and
a second winding layer wound around the outer circumferential surface of the cylinder part, the second winding layer having the thickness of the each of the first and the second edge hoop layers,
wherein the first hoop layer surrounds a central region of the cylinder part, and the second hoop layers surround two edge regions of the cylinder part with the first hoop layer interposed between the second hoop layers, wherein the second hoop layers occupy the entire region between the first hoop layer and the side parts, and wherein the second hoop layers as a whole have a constant thickness in the two edge regions.

2. The pressure vessel of claim 1, wherein the first hoop layer has a first thickness and each of the second hoop layers has a second thickness, and wherein the second thickness is ½ or less of the first thickness.

3. The pressure vessel of claim 1, wherein a center of the first hoop layer corresponds to a center of the cylinder part and a length of the first hoop layer is 40% to 60% of a length of the cylinder part.

4. The pressure vessel of claim 1, wherein a length of each of the second hoop layers is 20% to 30% of a length of the cylinder part.

5. The pressure vessel of claim 1, wherein the first hoop layer is provided by winding a carbon fiber composite material at a first winding angle, and each of the second hoop layers is provided by winding the carbon fiber composite material at a second winding angle different from the first winding angle.

6. The pressure vessel of claim 5, wherein the second winding angle is an angle smaller than the first winding angle.

7. The pressure vessel of claim 6, wherein the first winding angle is 89° to 91° and the second winding angle is larger than 85° and smaller than 89°.

8. The pressure vessel of claim 1, wherein the carbon fiber layer comprises a helical layer surrounding an outer surface of the first hoop layer, outer surfaces of the second hoop layers, and outer surfaces of the side parts.

9. The pressure vessel of claim 1, wherein the first hoop layer comprises:
an inner hoop layer surrounding the outer circumferential surface of the cylinder part; and
an outer hoop layer surrounding an outer surface of the inner hoop layer.

10. The pressure vessel of claim 1, wherein the second hoop layers comprise:
a first winding layer wound around the outer circumferential surface of the cylinder part; and
a second winding layer wound around the outer circumferential surface of the cylinder part so as to define a same layer as the first winding layer.

11. The pressure vessel of claim 10, wherein the first winding layer and the second winding layer are alternately disposed in a longitudinal direction of the cylinder part.

12. The pressure vessel of claim 11, wherein the first winding layer and the second winding layer are spaced apart from each other in the longitudinal direction of the cylinder part.

13. A method of manufacturing a pressure vessel, the method comprising:
providing a liner comprising a cylinder part and side parts provided at both ends of the cylinder part, each side part having a dome shape;
forming a first hoop layer that surrounds a part of an outer circumferential surface of the cylinder part, wherein forming the first hoop layer comprises forming an inner hoop layer that surrounds the outer circumferential surface of the cylinder part and forming an outer hoop layer that surrounds an outer surface of the inner hoop layer; and forming second hoop layers that surround other parts of the outer circumferential surface of the cylinder part, each of the second hoop layers having a smaller thickness than the first hoop layer, wherein forming the second hoop layers comprises winding a first winding layer around the outer circumferential surface of the cylinder part, and winding a second winding layer around the outer circumferential surface of the cylinder part so as to define a same layer as the first winding layer, and wherein the inner hoop layer and the first winding layer are formed first, and then the outer hoop layer and the second winding layer are formed, wherein:

the first hoop layer surrounds a central region of the cylinder part, and the second hoop layers surround two edge regions of the cylinder part with the first hoop layer interposed between the second hoop layers, wherein the second hoop layers occupy the entire region between the first hoop layer and the side parts, and wherein the second hoop layers as a whole have a constant thickness in the two edge regions.

14. The method of claim 13, wherein a center of the first hoop layer corresponds to a center of the cylinder part, a length of the first hoop layer is 40% to 60% of a length of the cylinder part, and a length of the second hoop layers is 20% to 30% of a length of the cylinder part.

15. The method of claim 13, wherein:
forming the first hoop layer comprises winding a carbon fiber composite material at a first winding angle; and
forming the second hoop layers comprises winding the carbon fiber composite material at a second winding angle smaller than the first winding angle.

16. The method of claim 13, further comprising forming a helical layer that surrounds an outer surface of the first hoop layer, outer surfaces of the second hoop layers, and outer surfaces of the side parts.

17. A pressure vessel comprising:
a liner comprising a cylinder part and side parts provided at both ends of the cylinder part, each side part having a dome shape; and
a carbon fiber layer comprising a first hoop layer surrounding a central region of an outer circumferential surface of the cylinder part, a first edge hoop layer surrounding a first edge region of the outer circumferential surface of the cylinder part, and a second edge hoop layer surrounding a second edge region of the outer circumferential surface of the cylinder part, the second edge region being opposite the first edge region and spaced apart by the central region so that the first hoop layer is interposed between the first and the second edge hoop layers, wherein each of the first and the second edge hoop layers comprises
a first winding layer wound around the outer circumferential surface of the cylinder part, the first winding layer having the thickness of the each of the first and the second edge hoop layers, and
a second winding layer wound around the outer circumferential surface of the cylinder part, the second winding layer having the thickness of the each of the first and the second edge hoop layers, wherein the first and the second edge hoop layers have a smaller thickness than the first hoop layer, wherein the second hoop layers occupy the entire region between the first hoop layer and the side parts, and wherein each of the first and the second edge hoop layers as a whole have a constant thickness in the first and the second edge regions.

18. The pressure vessel of claim 17, wherein the first hoop layer is provided by winding a carbon fiber composite material at a first winding angle, and each of the first and the second edge hoop layers is provided by winding the carbon fiber composite material at a second winding angle different from the first winding angle.

* * * * *